US012361819B2

(12) United States Patent
Edwards

(10) Patent No.: US 12,361,819 B2
(45) Date of Patent: Jul. 15, 2025

(54) DETECTION OF INTERFERENCE OF THE OPERATION OF SMOKE DETECTORS

(71) Applicant: Anastasia Mae Edwards, Morris, NY (US)

(72) Inventor: Anastasia Mae Edwards, Morris, NY (US)

( * ) Notice: Subject to any disclaimer, the term of this patent is extended or adjusted under 35 U.S.C. 154(b) by 0 days.

(21) Appl. No.: 18/478,689

(22) Filed: Sep. 29, 2023

(65) Prior Publication Data

US 2024/0112565 A1 Apr. 4, 2024

Related U.S. Application Data

(60) Provisional application No. 63/474,970, filed on Oct. 3, 2022.

(51) Int. Cl.
*G08B 29/04* (2006.01)

(52) U.S. Cl.
CPC ......... *G08B 29/046* (2013.01); *G08B 29/043* (2013.01)

(58) Field of Classification Search
CPC ............................ G08B 29/046; G08B 29/043
See application file for complete search history.

(56) References Cited

U.S. PATENT DOCUMENTS

| | | | | |
|---|---|---|---|---|
| 4,092,641 | A * | 5/1978 | Bellinghausen | G08B 29/046 200/61.03 |
| 5,867,095 | A * | 2/1999 | Klein | G08B 29/043 340/568.1 |
| 11,232,704 | B1 * | 1/2022 | Gardner | G08B 5/36 |
| 2003/0052780 | A1 * | 3/2003 | Buckley | H01H 36/0046 340/547 |
| 2005/0083205 | A1 * | 4/2005 | Deacy | G08B 19/005 340/506 |

* cited by examiner

*Primary Examiner* — Curtis A Kuntz
*Assistant Examiner* — James E Munion
(74) *Attorney, Agent, or Firm* — Brown & Michaels, PC

(57) ABSTRACT

A circuit added to a smoke detector which uses a sensing device to detect interference to smoke detectors. The circuit can be MOSFET circuit or a normally open relay circuit. The sensing devices to determine whether interference has occurred to the smoke detector, for example covering or interfering with the outer housing of the smoke detector can include a fan, a distance sensing device, a LiDAR device or other devices.

12 Claims, 3 Drawing Sheets

DETECTION OF INTERFERENCE OF THE OPERATION OF SMOKE DETECTORS

CROSS-REFERENCE TO RELATED APPLICATIONS

This application claims one or more inventions which were disclosed in Provisional Application No. 63/474,970, filed Oct. 3, 2022, entitled "TECHNOLOGY TO DETECT THE INTERFERENCE OF THE OPERATION OF SMOKE DETECTORS". The benefit under 35 USC § 119(e) of the United States provisional application is hereby claimed, and the aforementioned application is hereby incorporated herein by reference.

BACKGROUND

The present invention relates to smoke detectors, and more specifically to detection of interference of the operation of smoke detectors.

Current smoke detectors do not contain technology to stop the interference of detecting smoke when covered. The interference of smoke detectors is defined as any covering of the smoke detector with a cloth or another article such that air is blocked or prevented from entering a housing and the smoke detectors cannot detect smoke or other gases or other tampering with the outer housing of the smoke detector. Interference of smoke detectors can be a common issue in schools, dormitories, rental properties, apartment buildings, hotels, museums, workplaces and other public venues, posing a threat to the people occupying the space.

There are generally two types of smoke detectors—a photoelectric smoke detector and an ionization smoke detector.

A photoelectric smoke detector includes a housing defining an optical chamber which has a light source which provides a continuous focused light beam onto a mirror which is aimed directly into a sensing chamber, a light sensor outside of the sensing chamber, a photodiode light receptor, and an integrated circuit. If smoke enters the sensing chamber, the light that is reflected onto the light sensor is interrupted, scattering light in many directions, triggering the alarm.

A vent is present within the housing allowing air to flow from outside of the smoke detector to within the optical chamber which is also connected to the sensing chamber within the housing. When a fire breaks out, smoke enters the device through the vent and passes through the optical chamber and into the sensing chamber of the housing. When the smoke comes into contact with the light path, the infrared light is scattered and the scattered light hits the photodiode light receptor. Light detected by the photodiode light receptor triggers the photodiode light receptor to send a signal to the integrated circuit of the photoelectric smoke detector, causing an alarm to sound.

The ionization smoke detector has a housing defining a chamber which receives a first plate, a second plate, a radioactive source, electronic circuit, and a battery. The first plate and the second plate are connected to the battery which applies voltage to the first plate and the second plate. The first plate is positively-charged and the second plate is negatively-charged. The radioactive source constantly releases alpha particles that knock off the electrons from the surrounding air atoms, thus ionizing the nitrogen and oxygen atoms within the chamber of the housing. The positively-charged ions are attracted to the negative plate whereas the negatively-charged ions are attracted to the positive plate, thus creating a small, continuous electric current. This small ionization current can be easily measured by electronic circuitry which is connected to the plates.

When smoke enters the ionization chamber, the smoke particles attach to the ions and neutralize them. Consequently, the total number of ionized particles in the chamber is reduced. This reduction yields a decrease in the chamber current that is sensed by the electronic circuitry. The drop of current between the plates triggers an alarm. An externally visible red LED lights up when the detector alarm state is energized.

SUMMARY

According to one embodiment of the present invention, a circuit is added to a smoke detector which uses a sensing device to detect interference to smoke detectors. The circuit can be MOSFET circuit or a normally open relay circuit. The sensing devices to determine whether interference has occurred to the smoke detector, for example covering or interfering with the outer housing of the smoke detector can include a fan, a distance sensing device, a LiDAR device or other devices. The smoke detector can be a photoelectric smoke detector or ionization smoke detector.

DETAILED DESCRIPTION

It is noted that while smoke detectors are discussed, the detector can also detect carbon monoxide exclusive of smoke. All smoke contains carbon monoxide, carbon dioxide and particulate matter or soot. Smoke can contain many different chemicals, including, but not limited to: aldehydes, acid gases, sulfur dioxide, nitrogen oxides, polycyclic aromatic hydrocarbons (PAHs), benzene, toluene, styrene, metals and dioxins which can also be detected using detectors of embodiments of the present invention.

Figure 5:
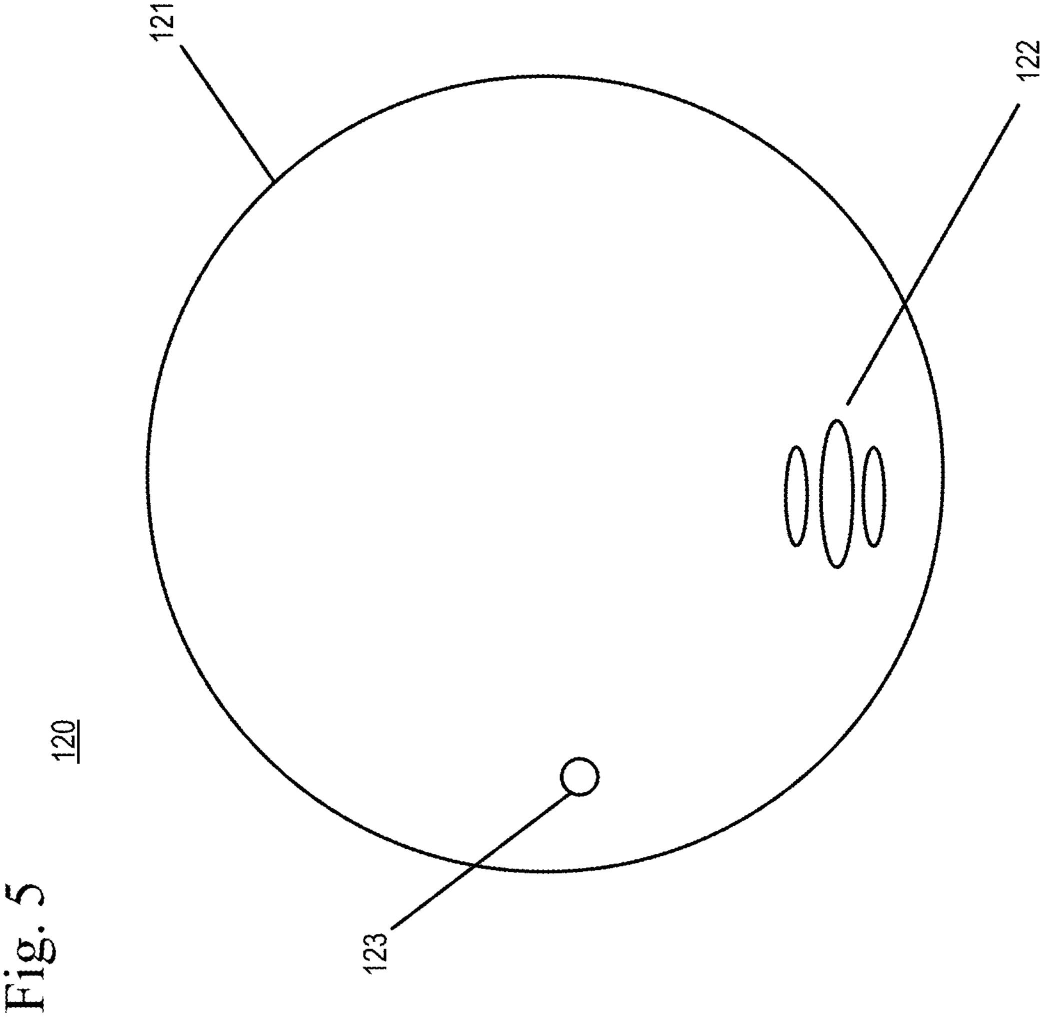
FIG. 5 shows an example of a smoke detector.

Embodiments of the present invention detect interference to smoke detectors. Once interference of the smoke detector is detected, an alarm of an alarm system, silent or audible is triggered to notify of the interference to the smoke detector. FIG. 5 shows an example of a smoke detector 120. The smoke detector 120 has an outer housing 121 with at least some slots 122 to allow the flow of air within the outer housing 121 of the smoke detector 120 to at least the sensing device 102 described below. In some embodiments, a light 123 is present within the outer housing which is lit up to visibly indicate an alarm system 104 is sounding from within the smoke detector 120.

In one embodiment, a sensing device installed into the smoke detector to detect interference triggers an open relay-based system. When an interference is detected by the sensing device, the open relay is closed, which completes a circuit causing the current to be sent to an alarm system, to indicate silently or audibly that interference has occurred. The sensing device is a distance sensor, a fan-based system, or a Light Detection and Ranging (LiDAR) sensor.

Figure 1:
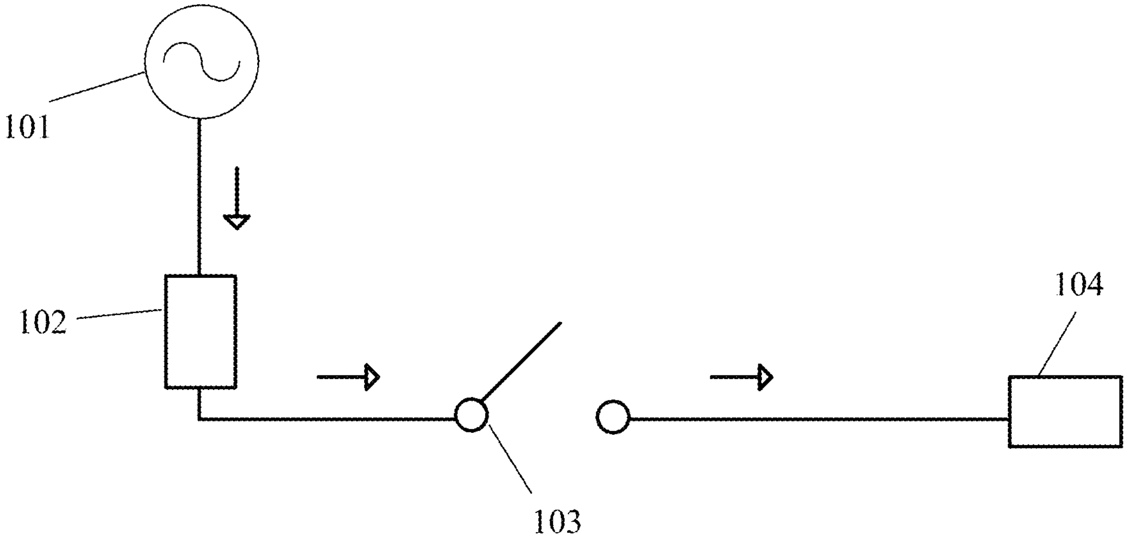
FIG. 1 shows a circuit diagram of normal open relay circuit during normal operation of the smoke detector without interference.
Figure 2:
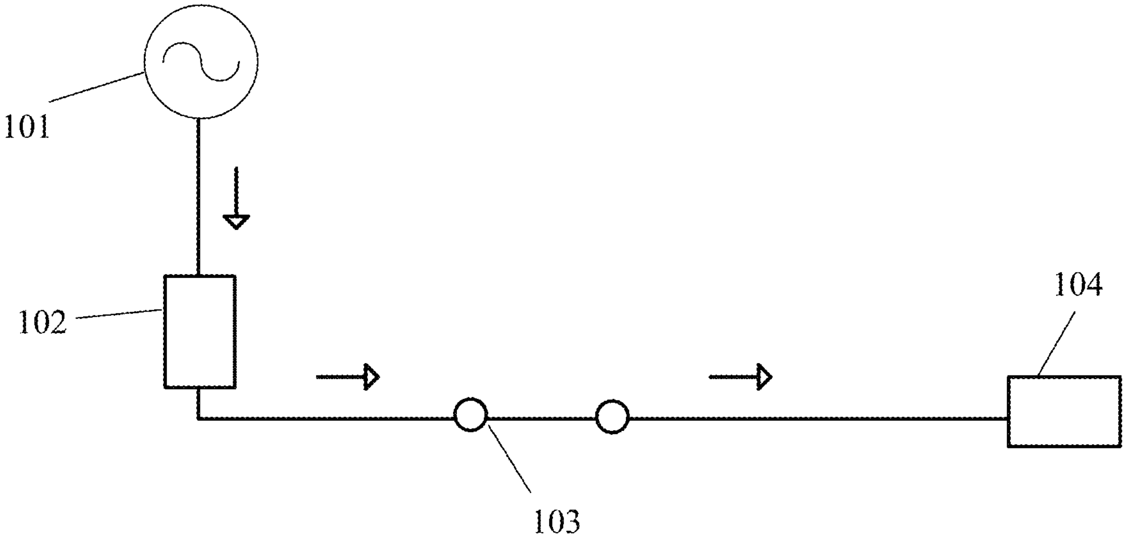
FIG. 2 shows a circuit diagram of normal open relay circuit during normal operation of the smoke detector with interference.

FIG. 1 shows a circuit diagram of normal open relay circuit during normal operation of the smoke detector 120 without interference. FIG. 2 shows a circuit diagram of the normal open relay circuit during detection of interference to the smoke detector 120.

A power source 101 provides power to a load 102 which is connected to an open relay switch 103 with a normally open position and a closed position. The open relay switch 103, when closed, is in contact with the alarm system 104.

When the open relay switch 103 is in a closed position as shown in FIG. 2, current is provided from the power source 101 to the alarm system 104. In the open relay switch closed position, interference is provided on or to the load 102 and the open relay switch 103 is provided with current to the open relay switch 103 to activate the relay's electromagnet to produce a magnetic field. The magnetic field pulls the relay switch 103 to a closed position such that power source 101 can supply current to the alarm system 104 through the relay switch 103 and the alarm system 104 is activated.

When the open relay switch 103 is in an open position as shown in FIG. 1, which is the normal position for the relay switch 103, current is not provided to the open relay switch 103 and cannot be supplied to the alarm system 104.

The power source is preferably alternate current (AC). The load 102 is a sensing device of a distance sensor, a fan-based system, or a Light Detection and Ranging (LiDAR) sensor. The open relay switch 103 may be a single pole, single throw (SPST) or a single pole, double throw (SPDT)

Figure 6:
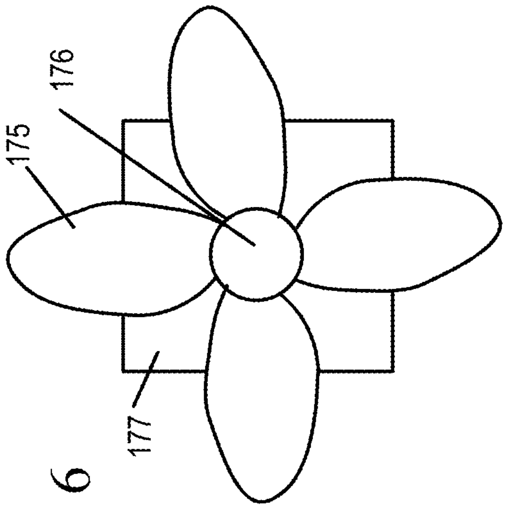
FIG. 6 shows an example of a fan system.

In one embodiment, the load 102 is a fan-based system which includes fan blades 175 fixed to a shaft 176 which is connected to a motor 177 as shown in FIG. 6. The motor 177 is powered by a low voltage supply power source 101 powering the smoke detector. Alternatively, an additional power supply can be present within the smoke detector. The fan blades 175 are placed within the smoke detector such that the blades 175 can spin and move air around with fan blades 175 and in communication with air outside of a smoke detector housing 121. The fan blades 175 are each preferably tilted at an angle which pushes air as the fan blades 175 spin. When the smoke detector 120 may be covered by a cloth or interfered with such that air flow is prevented to the fan blades 175 through the slots 122 of the smoke detector housing 121, causing the movement of the fan blades 175 to be interrupted. The interruption of movement of the fan blades 175 triggers the closure of the open relay switch 103 and the alarm system 104 to be activated, indicating an interference with the smoke detector 120.

In another embodiment, the load 102 is a sensing device of a distance sensor. The distance sensor would measure changes in the environment, such as a change in distance between the smoke detector 120 and a predetermined spot within the environment outside of and separate from the smoke detector 120, indicating changes that are not within predetermined parameters, which triggers the closure of the open relay switch 103 and the alarm system 104 to be activated, indicating an interference with the smoke detector 120.

In one embodiment, the distance sensor would include an infrared (IR) light-emitting diodes (LEDs) source and an integrated charge-coupled device (CCD) chip. The IR-LED of the distance sensor outputs a sound or light wave and the time for the sound or light wave to return to the distance sensor is used to calculate distance. For example, the distance sensor uses triangulation to calculate a distance according to an angle of a reflected IR beam off of a surface. When the LED focuses the beam of light on the surface, the light is reflected in all directions. The distance sensor acquires the reflected signal from the surface and the CCD chip defines the angle of the reflection to calculate the distance. If the distance to the wall or other set markers from the smoke detector 120 are not within the predetermined parameters, the closure of the open relay switch 103 is triggered and the alarm system 104 is activated. For example, placement of a cloth or some other item over the smoke detector is going to measure a distance which is much less than a wall across from the smoke detector 120.

In another embodiment, the distance sensor has an IR-LED and uses time-of-flight (TOF) distance sensor. The TOF sensor uses high power optical pulses in specific durations to illuminate the environment outside of the smoke detector and the distance sensor observes the reflected light. The phase shift between the illumination and the reflection is measured and translated into distance. If the distance to the wall or other set markers from the smoke detector 120 are not within the predetermined parameters, the closure of the open relay switch 103 is triggered and the alarm system 104 is activated. For example, placement of a cloth or some other item over the smoke detector is going to measure a distance which is much less than a wall across from the smoke detector 120.

In another embodiment, the load 102 is a LiDAR sensor. LiDAR uses a sensor which emits pulsed light waves into the environment proximate to the smoke detector. The pulsed light waves bounce off of surrounding objects, for example an object that is interfering with the smoke detector. The sensor calculates the time it takes for each pulse to return to the sensor and calculates the distance in which the pulse had to travel to impact an object. Any object that is deemed to be within 1-4 inches (25.4 mm-101.6 mm) from the smoke detector for a minimum of 60 seconds triggers the closure of the open relay switch 103, which triggers the alarm system 104 to be activated, indicating an interference with the smoke detector 120. The distance can be measured between the slots 122 to the outside housing 121 of the smoke detector 120.

Figure 3:
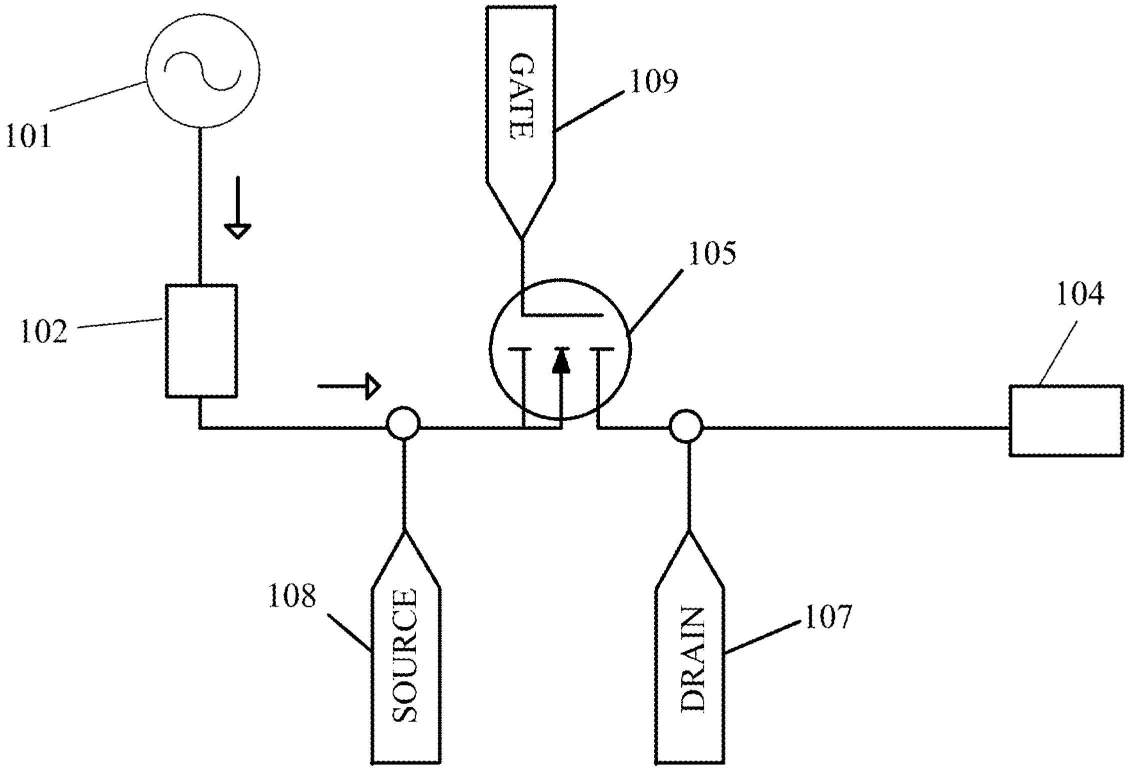
FIG. 3 shows a circuit diagram during normal operation of a circuit including a Metal Oxide Semiconductor Field Effect Transistor (MOSFET).
Figure 4:
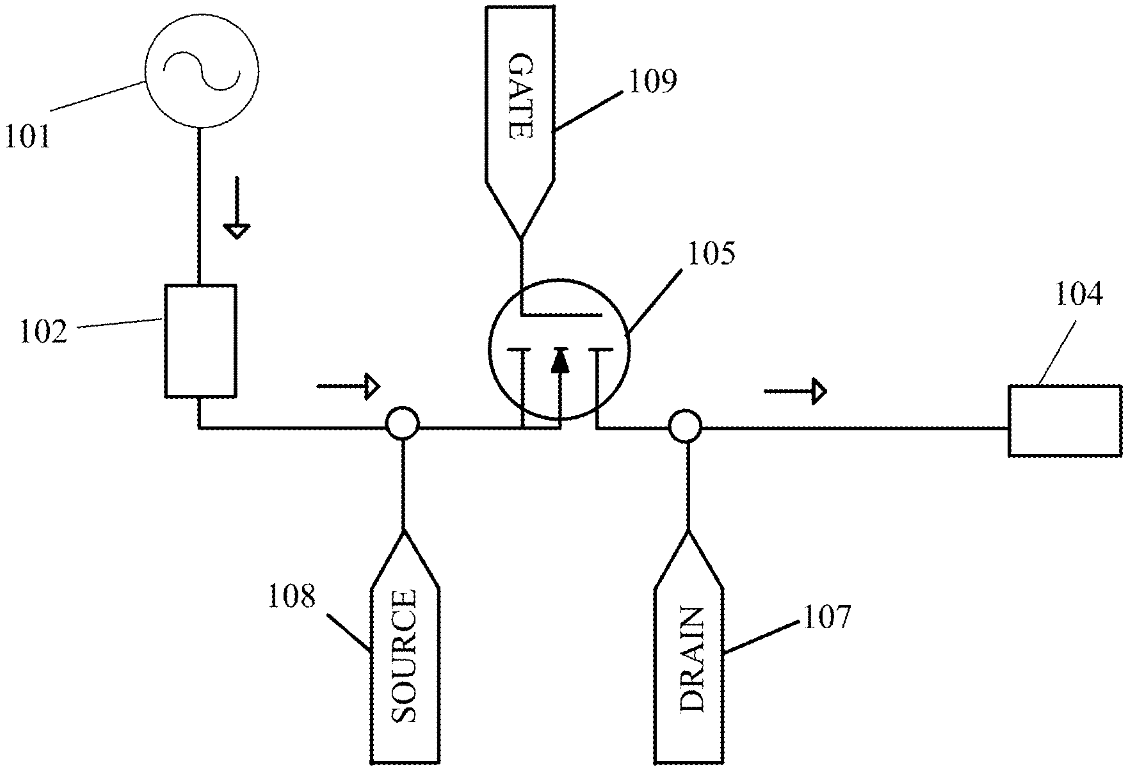
FIG. 4 shows a circuit diagram of the initiation of the alarm system of a circuit including a MOSFET.

FIG. 3 shows a circuit diagram during normal operation of a circuit including a Metal Oxide Semiconductor Field Effect Transistor (MOSFET). FIG. 4 shows a circuit diagram of the initiation of the alarm system of a circuit including a MOSFET.

A power source 101 provides power to a load 102 which is connected to a MOSFET 105. The MOSFET 105 is a three-terminal device, with the three-terminals being the gate terminal 106, the drain terminal 107, and the source terminal 108, with the gate terminal 106 controlling the conduction between the drain and the source terminals 107, 108. The MOSFET 105 is preferably N-channel enhancement type MOSFET (NMOS) or contains an enhancement mode. With an N-channel enhancement type MOSFET, the MOSFET remains off at zero gate voltage. To turn on the N-channel MOSFET 105, a minimum gate to source voltage (threshold voltage), a few volts above the source voltage is provided. If the gate to source voltage is increased, the drain current also increases in the same manner. When the MOSFET 105 is turned on, current flows into the drain provided to activate the alarm system 104 and out of the power source 101 provided through the load 102.

The power source is preferably alternate current (AC). The load 102 is a sensing device of a distance sensor, a fan-based system, or a Light Detection and Ranging (LiDAR) sensor. The open relay switch 103 may be a single pole, single throw (SPST) or a single pole, double throw (SPDT)

In one embodiment, the load 102 of a fan-based system includes fan blades 175 fixed to a shaft 176 which is connected to a motor 177 as shown in FIG. 6. The motor 177 is powered by a low voltage supply power source 101 powering the smoke detector 120. Alternatively, an additional power supply can be present within the smoke detector 120. The fan blades 175 are placed within the smoke detector 120 such that the fan blades 175 can spin and move air around with fan blades 175 and in communication with air outside of a smoke detector housing 121 through the slots 122. The fan blades 175 are each preferably tilted at an angle which pushes air as the fan blades 175 spin. When the smoke detector 120 may be covered by a cloth or interfered with such that air flow is prevented to the fan blades 175 through the slots 122 in the smoke detector outer housing 121, causing the movement of the fan blades 175 to be interrupted. The interruption of movement of the fan blades 175 triggers the threshold voltage to be sent to the gate in order to turn on the MOSFET 105, such that current flows into the drain and is provided to activate the alarm system 104, indicating an interference with the smoke detector 120.

In another embodiment, the load 102 is a sensing device of a distance sensor. The distance sensor would measure changes in the environment and changes that are not within predetermined parameters, triggers the threshold voltage to be sent to the gate in order to turn on the MOSFET 105. Turning on of the MOSFET allows current to flow into the drain and is provided to activate the alarm system 104, indicating an interference with the smoke detector 120.

In one embodiment, the distance sensor would include an infrared (IR) light-emitting diodes (LEDs) source and an integrated charge-coupled device (CCD) chip. The IR-LED of the distance sensor outputs a sound or light wave and the time for the sound or light wave to return to the distance sensor is used to calculate distance. For example, the distance sensor uses triangulation to calculate a distance according to an angle of a reflected IR beam off of a surface. When the LED focuses the beam of light on the surface, the light is reflected in all directions. The distance sensor acquires the reflected signal from the surface and the CCD chip defines the angle of the reflection to calculate the distance. If the distance to the wall or other set markers from the smoke detector 120 are not within the predetermined parameters, the threshold voltage to turn on the MOSFET 105 is triggered, such that current flows into the drain and is provided to activate the alarm system 104 of the smoke detector 120. For example, placement of a cloth or some other item over the smoke detector is going to measure a distance which is much less than a wall across from the smoke detector 120.

In another embodiment, the distance sensor has an IR-LED and uses time-of-flight (TOF) distance sensor. The TOF sensor uses high power optical pulses in specific durations to illuminate the environment outside of the smoke detector and the distance sensor observes the reflected light. The phase shift between the illumination and the reflection is measured and translated into distance. If the distance to the wall or other set markers from the smoke detector 120 are not within the predetermined parameters, the threshold voltage to turn on the MOSFET 105 is triggered, such that current flows into the drain and is provided to activate the alarm system 104 of the smoke detector 120. For example, placement of a cloth or some other item over the smoke detector is going to measure a distance which is much less than a wall across from the smoke detector 120.

In another embodiment, the load 102 is a LiDAR. LiDAR uses a sensor which emits pulsed light waves into the environment proximate to the smoke detector. The pulsed light waves bounce off of surrounding objects, for example an object that is interfering with the smoke detector. The sensor calculates the time it takes for each pulse to return to the sensor and calculates the distance in which the pulse had to travel to impact an object. Any object that is deemed to be within 1-4 inches (25.4 mm-101.6 mm) from the smoke detector for a minimum of 60 seconds triggers the threshold voltage to be sent to the gate in order to turn on the MOSFET 105, such that current flows into the drain and is provided to activate the alarm system 104, indicating an interference with the smoke detector. The distance can be measured between through the slots 122 to the outside housing 121 of the smoke detector 120.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A smoke detector having an interference detection device, the interference detection device comprising:
- a power source;
- a sensing device for sensing interference to the smoke detector has occurred, wherein the sensing device is a Light Detection and Ranging (LiDAR) sensor,
- an open relay switch connected to the power source via the sensing device, the open relay switch having an open position and a closed position; and
- an alarm system connected to the open relay switch, the alarm system having an indicator of interference to the smoke detector has occurred;
- wherein when the open relay switch is moved to the closed position, power is supplied to the alarm system initiating the indicator of the alarm system;
- wherein when an object is sensed to be within 25.4 mm-101.6 mm from the smoke detector for a minimum of 60 seconds due to interference, the open relay switch is moved to the closed position.

2. The smoke detector of claim 1, wherein the indictor of the alarm system is visible.

3. The smoke detector of claim 1, wherein the indictor of the alarm system is audible.

4. The smoke detector of claim 1, wherein the open relay switch is a single pole, single throw switch.

5. The smoke detector of claim 1, wherein the open relay switch is a sing pole, double throw switch.

6. A smoke detector having an interference detection device comprising:
- a power source;
- a sensing device for sensing interference to the smoke detector has occurred;
- a Metal Oxide Semiconductor Field Effect Transistor (MOSFET) connected to the power source via the sensing device, the Metal Oxide Semiconductor Field Effect Transistor having an on position and an off position, wherein the sensing device is a distance sensor adapted to measure a distance between the smoke detector and a predetermined spot outside of and separate from the smoke detector, the distance sensor comprising an infrared light emitting diode source and a time-of-flight sensor; and an alarm system connected to the Metal Oxide Semiconductor Field Effect Transistor, the alarm system having an indicator of interference to the smoke detector has occurred;

wherein when the Metal Oxide Semiconductor Field Effect Transistor is moved to the closed position, power is supplied to the alarm system initiating the indictor of the alarm system;

wherein when the distance between the smoke detector and the predetermined spot is outside of a predetermined distance parameter, the Metal Oxide Semiconductor Field Effect Transistor is moved to the closed position.

7. The smoke detector of claim 6, wherein the Metal Oxide Semiconductor Field Effect Transistor is a N-channel enhancement type.

8. The smoke detector of claim 6, wherein the indictor of the alarm system is visible.

9. The smoke detector of claim 6, wherein the indictor of the alarm system is audible.

10. A smoke detector having an interference detection device, the interference detection device comprising:

a power source;

a sensing device for sensing interference to the smoke detector has occurred, wherein the sensing device is a distance sensor adapted to measure a distance between the smoke detector and a predetermined spot outside of and separate from the smoke detector, the distance sensor comprising an infrared light emitting diode source, a sensor and an integrated charge-coupled chip;

an open relay switch connected to the power source via the sensing device, the open relay switch having an open position and a closed position; and an alarm system connected to the open relay switch, the alarm system having an indicator of interference to the smoke detector has occurred;

wherein when the open relay switch is moved to the closed position, power is supplied to the alarm system initiating the indicator of the alarm system;

wherein when the distance between the smoke detector and the predetermined spot is outside of a predetermined distance parameter, the open relay switch is moved to the closed position.

11. The smoke detector of claim 10, wherein the indictor of the alarm system is visible.

12. The smoke detector of claim 10, wherein the indicator of the alarm system is audible.

* * * * *